United States Patent Office.

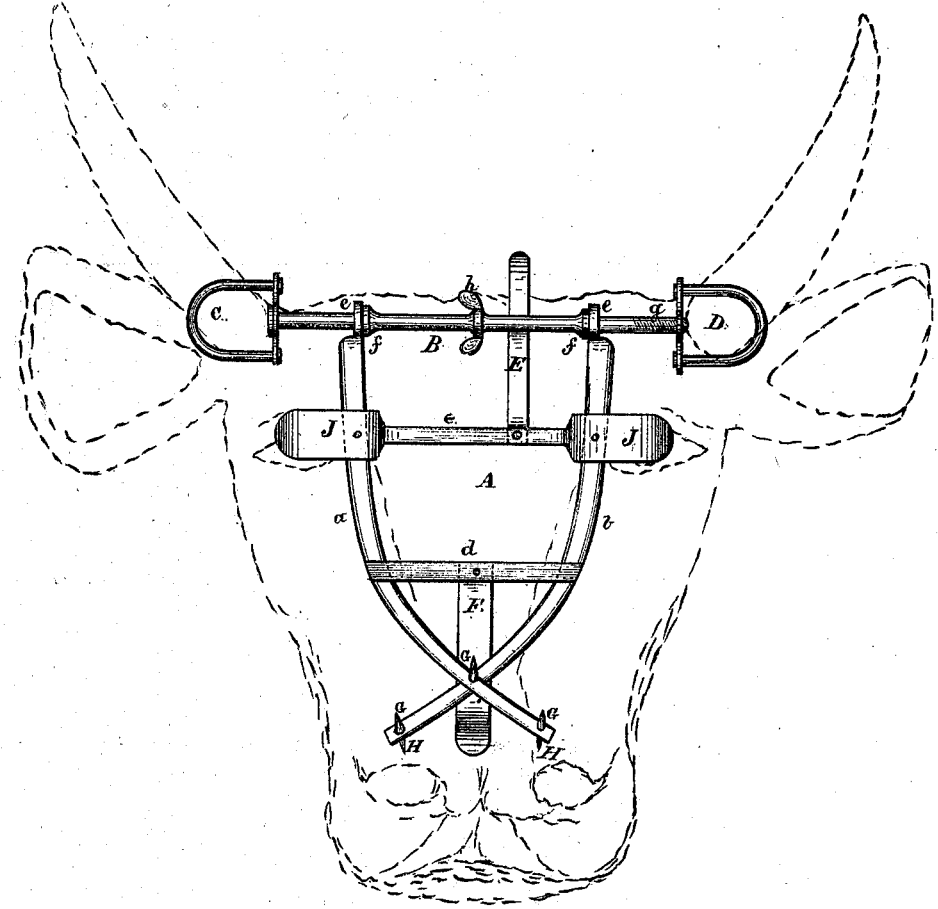

CHARLES BETTINGER, OF SOUTH DANSVILLE, NEW YORK.

Letters Patent No. 95,072, dated September 21, 1869.

---

IMPROVEMENT IN DEVICE FOR PREVENTING CATTLE FROM JUMPING.

---

The Schedule referred to in these Letters Patent and making part of the same.

---

*To all whom it may concern:*

Be it known that I, CHARLES BETTINGER, of South Dansville, in the county of Steuben, and State of New York, have invented a new and useful Device for Preventing Cattle from Jumping, Throwing Fences, Sucking, &c.; and I do hereby declare the following to be a full, clear, and exact description of the same, sufficient to enable others skilled in the art to which my device appertains, to make and use the same, reference being had to the accompanying drawing, forming part of this specification, in which the figure is a front view, somewhat in perspective, of the device, as applied to the head of the animal.

My invention is a device to prevent cattle from jumping, throwing fences, sucking, &c.; and consists in suitable pins, located on a frame suspended from a rod, which is hung on the horns of the animal, in connection with springs, so arranged that when the animal is grazing, or passive, the device is inoperative; but when she attempts to do what the invention is designed to obviate, then the pins prick or stick her sufficiently as to cause her to desist.

In the drawing—

A represents a frame, of any suitable material, and consisting, in the present case, of two side pieces, *a b*, and cross-pieces *c d*.

The upper of this frame is formed with ears *e e*, through which is passed a rod, B, and to one end of which is swivelled a ring, hook, or loop, C.

The other end is formed with a screw-thread, *g*, and fits into one side of another loop, D, which is similar in form to loop C. These loops are placed on the horns of the animal.

A thumb-piece, square, or equivalent device, *h*, is formed on the rod, in order to rotate it, and thereby adjust the loops relative to the distance between the horns, and afterward tighten them on, as well as to release them when the device is to be removed.

*f f* represent collars or shoulders, placed on the rod B, to prevent the lateral displacement thereof.

To one of the cross-bars I secure a spring, E, which points upward and inward, and is adapted to bear against the brow of the animal, to keep the lower part of the frame A toward her face.

Contact therewith is prevented by means of another spring, F, which points inwardly and somewhat downwardly, and then is slightly curved at its free end.

G G G represent pins, which project near the bottom of the outer face of the frame A, and H H represent pins, projecting on the inner face thereof.

The pins H H do not extend beyond the spring F, and come in contact with the face of the animal, unless force is applied to overcome the pressure of said spring.

J J are blinds, secured to the frame A, at such positions as to cover the eyes of the animal when the device is applied thereto.

The operation is as follows:

The device is suspended from the horns, and properly tightened thereon. The animal is permitted to graze or remain at rest without any annoyance; but if she attempts to throw fences, or attack persons or objects, the pins H H will prick her head. If she attempts to suck herself, she runs the pins G G into her body, and by these means is caused to desist in her efforts.

The blinds J permit the animal to see what is below her, and on the ground, but not what is before her, and this, in a measure, prevents her from jumping fences.

The device is applicable to all animals who are viciously disposed, and is intended to remedy the evils stated, as well as other similar ones, which cattle are liable to possess.

Having thus described my invention,

What I claim as new, and desire to secure by Letters Patent, is—

1. The device for the purpose described, consisting of the suspended frame A, springs E F, inwardly-projecting pins H, outwardly-projecting pins G, and blinds J, arranged together for the purpose described.

2. The spring E, spring F, pins H H, and frame A, constructed and operated substantially as described.

3. The combination, with the suspended frame A, of the spring E at its upper end, and the spring F at its lower end, operating, in relation to each other, substantially as described.

4. The blinds J, as applied to the suspended frame, for the purpose as described and set forth.

The above signed by me, this 10th day of July, 1869.

CHARLES BETTINGER.

Witnesses:
C. R. KERN,
FRANZ NEINHARD.